(12) United States Patent
Cappeller et al.

(10) Patent No.: US 9,133,984 B2
(45) Date of Patent: Sep. 15, 2015

(54) GUARD FOR GAS CYLINDER ACTUATORS

(75) Inventors: Augusto Cappeller, Bassano Del Grappa (IT); Massimo Fiorese, Bassano Del Grappa (IT); Daniel Fantinato, Bassano Del Grappa (IT)

(73) Assignee: SPECIAL SPRINGS S.R.L., Rosa' (IT)

( * ) Notice: Subject to any disclaimer, the term of this patent is extended or adjusted under 35 U.S.C. 154(b) by 194 days.

(21) Appl. No.: 12/452,211

(22) PCT Filed: Jun. 25, 2008

(86) PCT No.: PCT/EP2008/058088
§ 371 (c)(1),
(2), (4) Date: Dec. 22, 2009

(87) PCT Pub. No.: WO2009/003892
PCT Pub. Date: Jan. 8, 2009

(65) Prior Publication Data
US 2010/0132811 A1 Jun. 3, 2010

(30) Foreign Application Priority Data

Jul. 3, 2007 (IT) .............................. PD2007A0226

(51) Int. Cl.
| | |
|---|---|
| *F16K 27/12* | (2006.01) |
| *F16P 1/00* | (2006.01) |
| *F16F 9/38* | (2006.01) |
| *F15B 15/14* | (2006.01) |
| *F16P 3/02* | (2006.01) |

(52) U.S. Cl.
CPC ............... *F16P 1/00* (2013.01); *F15B 15/1457* (2013.01); *F16F 9/38* (2013.01); *F16K 27/12* (2013.01); *F16P 3/02* (2013.01); *Y10T 137/7043* (2015.04)

(58) Field of Classification Search
CPC ................................. F16K 27/12; F16F 9/38
USPC ................. 137/343, 375, 377; 92/51, 52, 53, 92/169.1, 169.2, 169.3, 169.4, 170.1, 92/170.2
See application file for complete search history.

(56) References Cited

U.S. PATENT DOCUMENTS

| | | | | |
|---|---|---|---|---|
| 2,761,425 | A | * | 9/1956 | Bertsch et al. ..................... 92/82 |
| 2,971,399 | A | | 2/1961 | Roberts |
| 3,086,502 | A | * | 4/1963 | Gondek ............................ 92/51 |
| 3,703,125 | A | * | 11/1972 | Pauliukonis .................. 92/85 R |
| 4,073,219 | A | * | 2/1978 | Bimba ............................ 92/128 |
| 4,909,131 | A | * | 3/1990 | Nix et al. ..................... 92/169.1 |
| 4,936,193 | A | | 6/1990 | Stoll |
| 5,172,625 | A | * | 12/1992 | Latham ............................ 92/51 |
| 5,271,476 | A | * | 12/1993 | Minamibata ................. 180/400 |
| 5,791,445 | A | * | 8/1998 | Kaufmann et al. ...... 188/322.12 |

(Continued)

FOREIGN PATENT DOCUMENTS

| | | |
|---|---|---|
| EP | 0 003 869 A | 9/1979 |
| FR | 2 578 934 A | 9/1986 |

(Continued)

*Primary Examiner* — Kevin Murphy
(74) *Attorney, Agent, or Firm* — Modiano & Associati; Albert Josif; Daniel O'Byrne

(57) ABSTRACT

A guard for gas cylinder actuators, comprising a rigid or deformable covering element, to be fixed to the stem of the gas cylinder actuator with which it is associated or to the translating body against which the gas cylinder actuator is intended to act, the covering element being contoured so as to extend radially from the fixing region in order to protect the stem and the opening of the body of the actuator from which the stem exits.

6 Claims, 5 Drawing Sheets

(56) References Cited

U.S. PATENT DOCUMENTS

| | | | |
|---|---|---|---|
| 5,829,472 A * | 11/1998 | Greenwood et al. | 137/312 |
| 5,975,123 A * | 11/1999 | Underwood | 137/382 |
| 6,135,434 A | 10/2000 | Marking | |
| 6,474,216 B2 * | 11/2002 | Heinz et al. | 92/51 |
| 2001/0039876 A1 * | 11/2001 | Suzuki et al. | 92/169.1 |

FOREIGN PATENT DOCUMENTS

| | | |
|---|---|---|
| GB | 1 578 735 A | 11/1980 |
| KR | 10-2004-0029675 A | 4/2004 |

\* cited by examiner

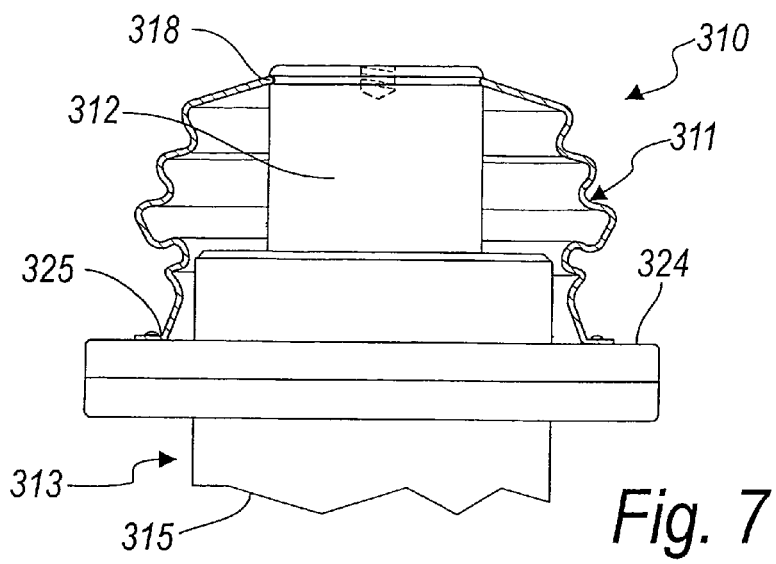
*Fig. 7*
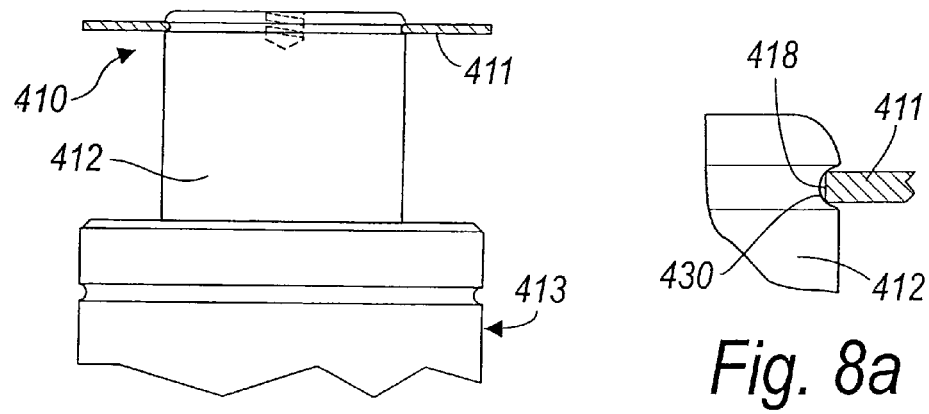
*Fig. 8*
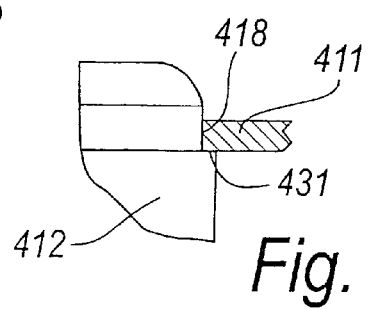
*Fig. 8a*
*Fig. 8b*

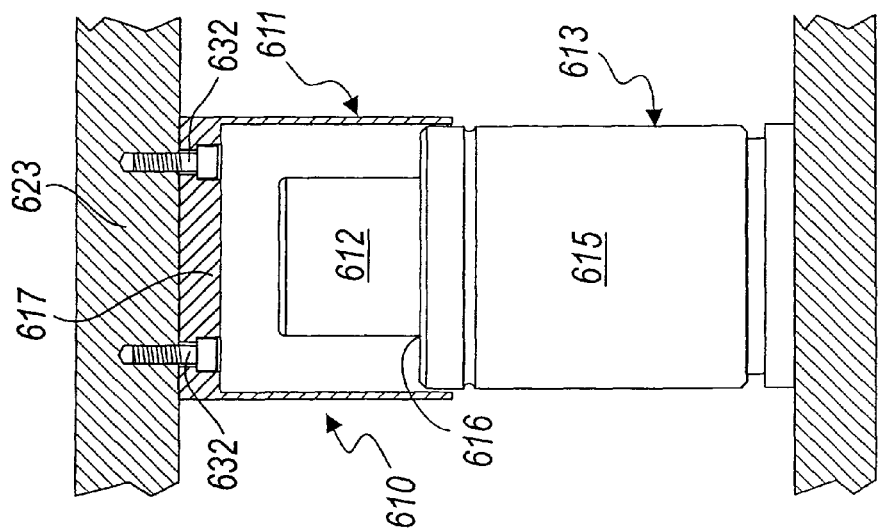
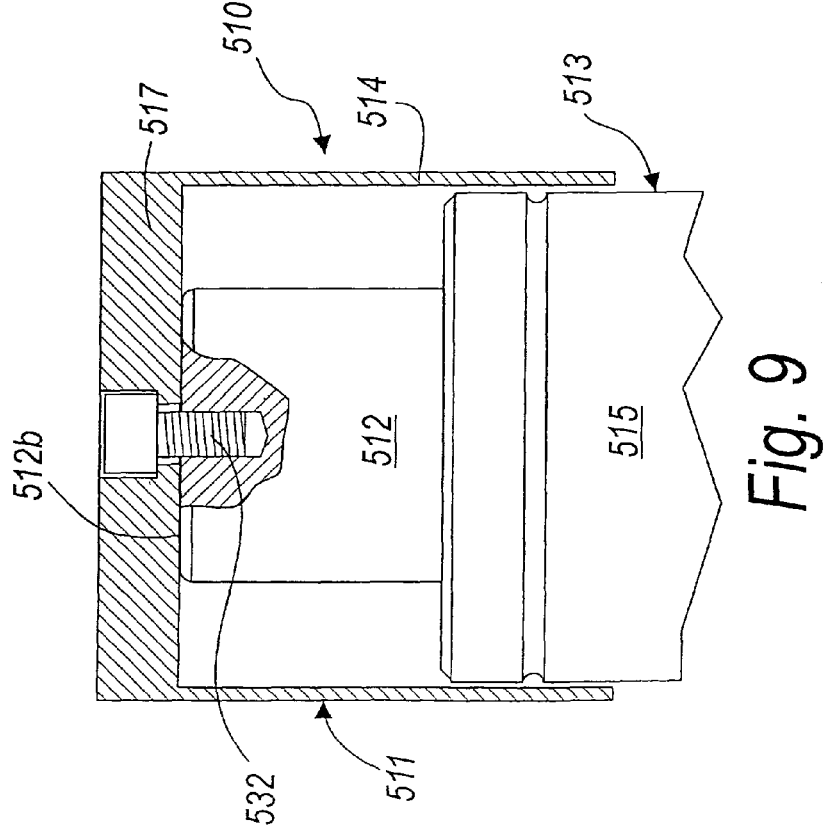

GUARD FOR GAS CYLINDER ACTUATORS

The present invention relates to a guard for gas cylinder actuators.

BACKGROUND OF THE INVENTION

Generally, gas cylinder actuators are part of equipment for locking a metal sheet adapted to be shaped in a press or worked with another pressing system, for blanking or drawing, and are used to extract or retain the metal sheet during its working.

Usually, in this type of work and when using these pressing systems, oils or other emulsifying liquids are used abundantly in order to improve work.

However, while these oils or similar liquids fully perform their task of improving sheet metal working, they often damage the gas cylinder actuators, which are also fitted within the die.

The oil in fact penetrates the gas cylinder actuators, passing through the gasket, entrained by the moving stem; this condition creates problems in terms of durability of the gas cylinder actuator, since it compromises its tightness with respect to the pressurized gas.

In order to obviate this drawback, protective domes are known which can be made of various materials, depending on the aggressive agents from which the associated gas cylinder actuator is to be protected, and must be fixed so as to cover part of the body of the gas cylinder actuator on the stem side, which is the part that is most subject to being splashed by the oils and fluids that fall from the overlying metal sheet being worked.

These domes have a passage hole for the work strokes of the stem, and therefore, although they achieve the task of protecting the body of the gas cylinder actuator, they do not protect sufficiently the gaskets between the body and the stem, since the aggressive liquids penetrate between the hole of a dome and the stem that passes through it and reach the dynamic seals between the body and the stem of the gas cylinder actuator.

SUMMARY OF THE INVENTION

The aim of the present invention is to provide a guard for gas cylinder actuators which is capable of obviating the drawbacks of known types of dome-like device.

Within this aim, an object of the present invention is to provide a guard which can be applied easily also to existing and working gas cylinder actuators.

Another object of the present invention is to provide a guard which prevents oils or any other liquid or fluid in general from reaching the dynamic seals provided within the body of a gas cylinder actuator for the stem.

Another object of the present invention is to provide a guard for gas cylinder actuators which can be manufactured with low costs and with known systems and technologies.

This aim and these and other objects, which will become better apparent hereinafter, are achieved by a guard for gas cylinder actuators, characterized in that it is constituted by a rigid or deformable covering element, to be fixed to the stem of the gas cylinder actuator with which it is associated or to the translating body against which the gas cylinder actuator is intended to act, said covering element being contoured so as to extend radially from the fixing region in order to protect the stem and the opening of the body of the actuator from which said stem exits.

BRIEF DESCRIPTION OF THE DRAWINGS

Further characteristics and advantages of the invention will become better apparent from the following detailed description of six preferred but not exclusive embodiments thereof, illustrated by way of non-limiting example in the accompanying drawings, wherein:

FIG. 7 is a sectional side view of a device according to the invention in a third embodiment;

FIG. 8 is a view of a device according to the invention in a fourth embodiment;

FIGS. 8a and 8b each show a variation of a detail of the device in its fourth embodiment;

FIG. 9 is a partially sectional side view of a device according to the invention in a fifth embodiment thereof;

FIG. 10 is a partially sectional side view of a device according to the invention in a sixth embodiment thereof.

DESCRIPTION OF THE PREFERRED EMBODIMENTS

Figure 2:
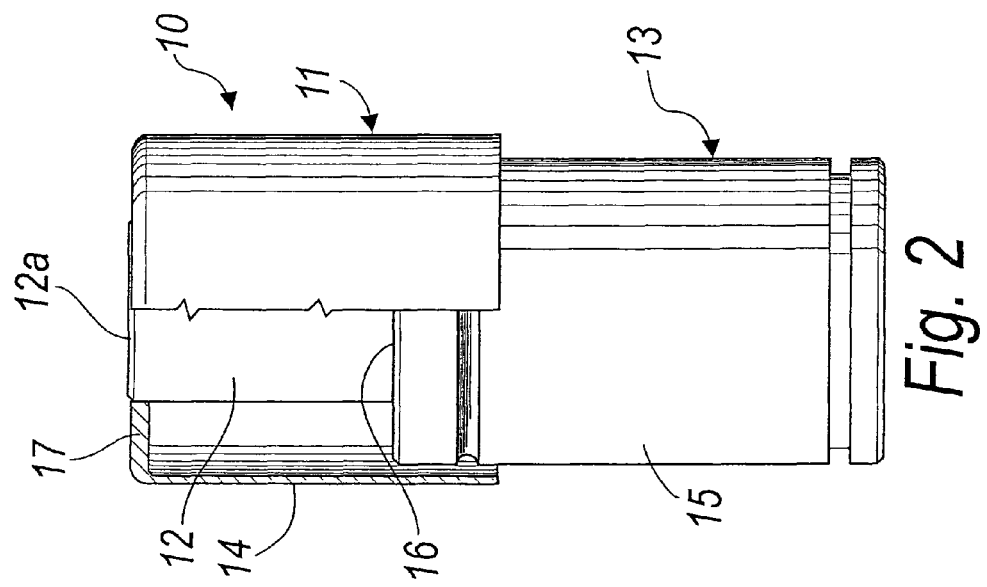
FIG. 2 is the same side view as in FIG. 1, in which the stem of the actuator is extended out of the body of said actuator.
Figure 1:
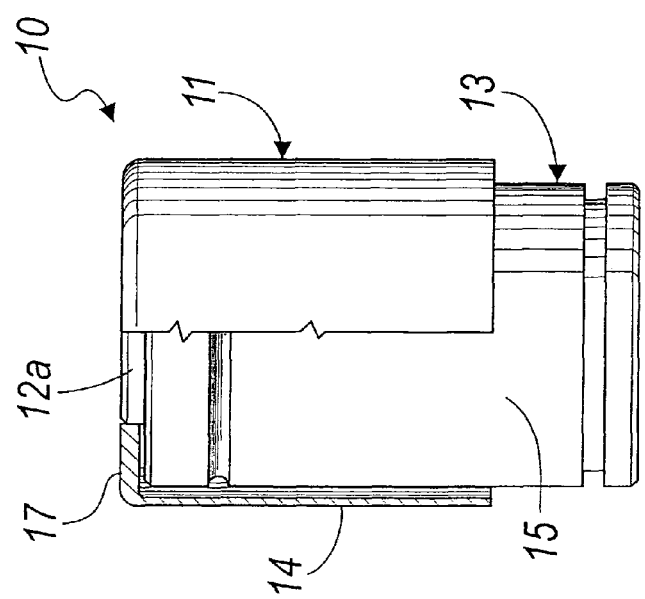
FIG. 1 is a side view of a gas cylinder actuator with a device according to the invention.

With reference to the figures, a guard for gas cylinder actuators according to the invention is generally designated by the reference numeral 10 in its first embodiment.

The guard 10 comprises a covering element, which is constituted by a dome 11 designed to be keyed by way of fixing means at an end 12a of a stem 12 of a gas cylinder actuator 13.

The dome 11 is constituted by a tubular body 14, which is shaped so as to affect a body 15 of the actuator 13 both when the stem 12 is completely extended and when the stem 12 is completely retracted.

In the embodiment shown, the substantially cylindrical tubular body 14 has, monolithically therewith, an annular cover 17 which surrounds the stem 12; therefore, the stem 12 enters a hole 18 of the annular cover 17; this embodiment with the body 14 and the cover 17 provided monolithically is, as mentioned, an example, and the tubular body 14 and the annular cover 17 can also be provided as two separate elements which are mutually joined.

The dome 11 can be made of aluminum, iron, or other metallic materials, but is preferably made of plastic material, particularly polyurethane.

Such plastic material is transparent or semitransparent, colored or not, so that in any case the entire gas cylinder actuator remains visible to an operator who has to check it when it is in use.

The dome 11 can also be made of rubber.

Figure 3:
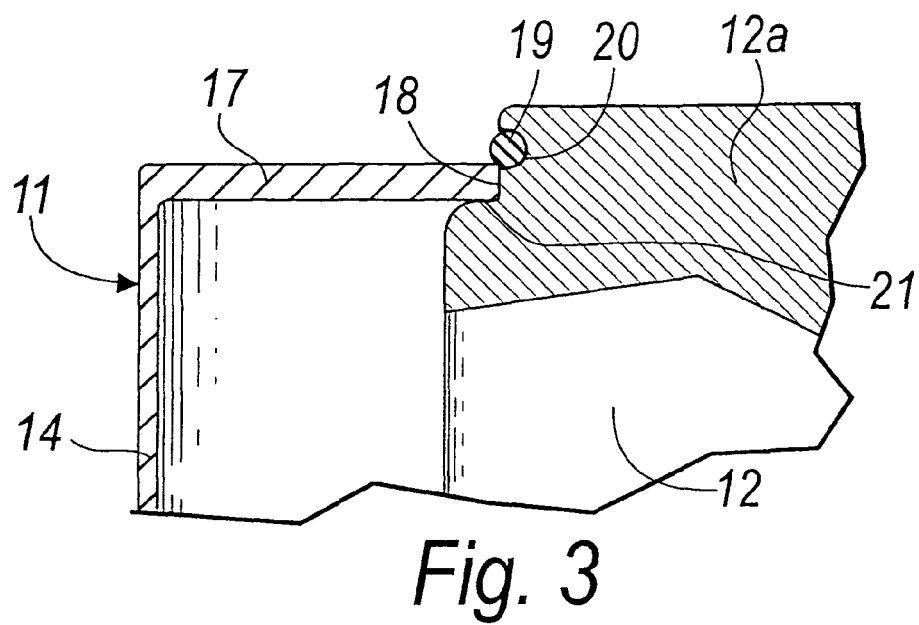
FIG. 3 is a view of a first embodiment of the means for fixing the covering element to the stem.

FIG. 3 shows schematically, in a first embodiment, the means for fixing the dome 11 to the stem 12.

Such means comprise a snap ring or elastic toroidal ring 19, which is partially inserted within a corresponding annular slot 20 provided on the end 12a of the stem and partly protrudes so as to block the rim of the hole 18 of the annular cover 17, such rim abutting against a shoulder 21 which is also formed on the stem 12 proximate to the slot 20.

The assembly of the actuator and the dome is therefore extremely easy, since it is sufficient to insert the end 12a of the stem in the hole 18 of the dome and insert the ring 19 in its seat 20.

Figure 4:
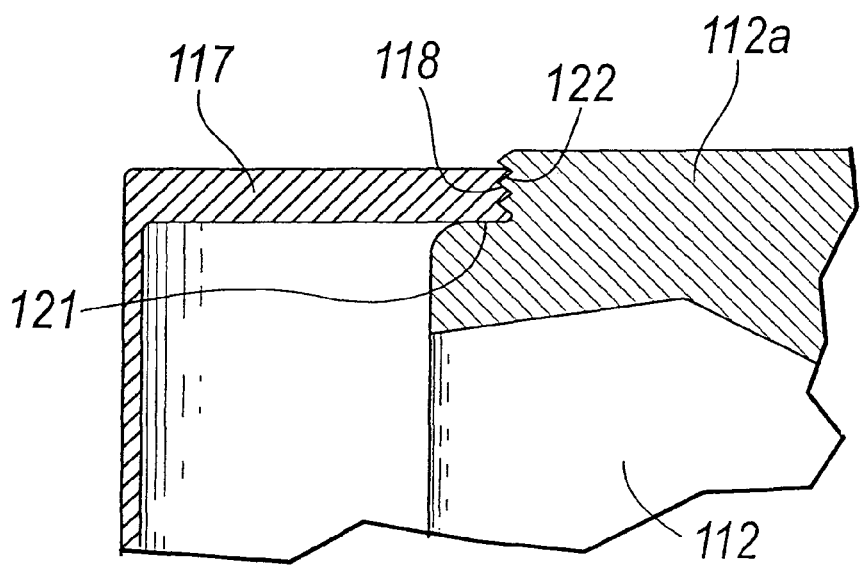
FIG. 4 is a view of a second embodiment of the means for fixing the covering element to the stem.

FIG. 4 is a view of the fixing means in a second embodiment thereof.

In this second embodiment, the fixing means are constituted by the threaded hole 118 and by a complementary thread 122 provided on the end 112a of the stem 112, onto which the hole 118 is screwed until abutment against the shoulder 121 occurs.

In another embodiment of the fixing means, which is similar to what will be described hereinafter for a fourth embodiment of the invention and illustrated in FIG. 8a, the dome 11 can be keyed to the stem 12 so as to interlock with its hole 18 in an annular slot provided on the stem 12.

With the guard according to the invention it has been shown that it is substantially impossible for oil or other emulsified liquid that falls from above the actuator 13 to reach an opening 16 of the body 15 from which the stem 12 exits, proximate to which the seals for the stem are provided in the body 15.

As an alternative, the dome 11 can be simply keyed by interference on the end 12a of the stem.

Figure 5:
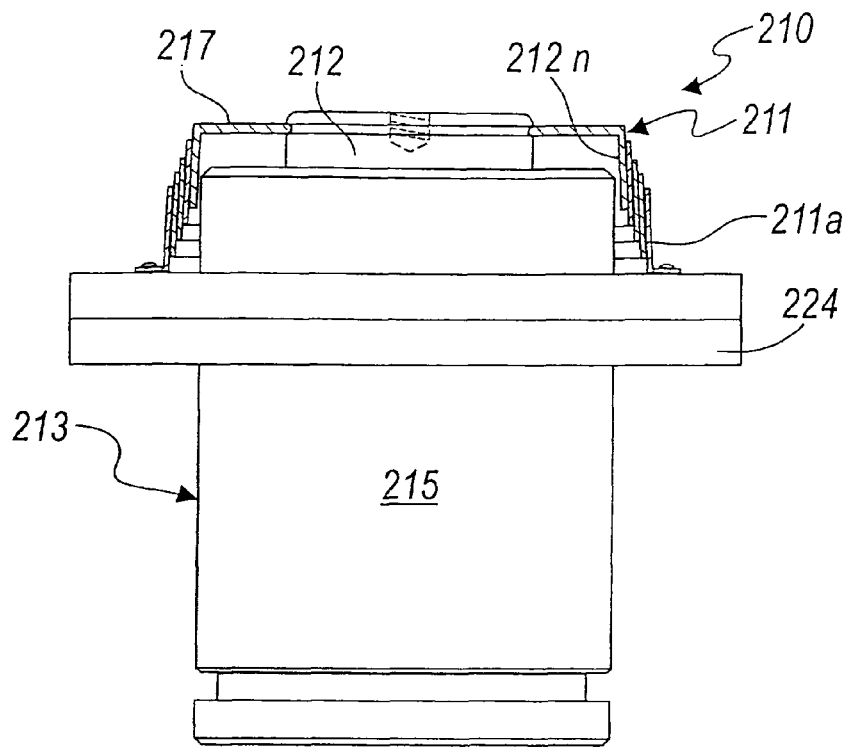
FIGS. 5 and 6 are each sectional side views, in two different configurations, of a device according to the invention in a second embodiment thereof.
Figure 6:
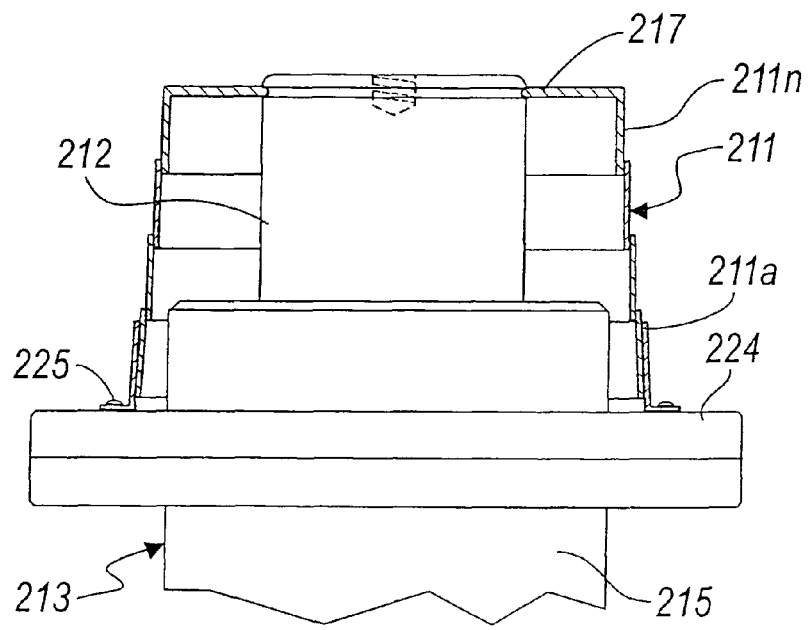

In a second embodiment, shown in FIGS. 5 and 6 and designated therein by the reference numeral 210, the guard according to the invention comprises a covering element provided by a telescopic dome 211.

The telescopic dome 211 therefore comprises a series of concentric annular parts which can be telescoped with respect to each other, a first base part 211a being intended to be fixed to a plane 224 which is jointly connected to the body 215 of the actuator 213, a last upper part 211n being provided with the annular cover 217 to be keyed to the stem 212.

In FIG. 5, the guard 210 is shown as it appears when the stem 212 is retracted; in FIG. 6 it is instead shown when the stem is extended.

The guard 210 with the telescopic dome 211, by way of the fixing of the annular body 217 and also of the base edge, provided by a perimetric flap 225 of the first annular part 211a of the dome 211, to the plane 224, prevents the passage of oil or other debris also in the direction from the base of the actuator 213 toward the end of the stem 212.

In a third embodiment, shown in FIG. 7, the guard 310 comprises a covering element, which is constituted by a concertina hood 311 which is deformable and is provided with a central hole 318 in which the stem 312 of the actuator 313 is inserted and, on the opposite side, the perimetric flap 325 for fixing to the plane 324 which is jointly connected to the body 315 of the actuator 313.

In a fourth embodiment, shown in FIGS. 8, 8a and 8b, the device 410 comprises a covering element, which is constituted by a disk 411 to be keyed onto the stem 412 of the actuator 413.

The disc 411 has a central hole 418, by means of which it can be keyed onto the stem 412 in various manners, two of which are described hereinafter.

FIG. 8a shows the disk 411 keyed by interlocking with its hole 418 in an annular slot 430 provided on the stem 412.

FIG. 8b shows the disk 411 forced onto the stem 412 and in abutment against a shoulder 431 formed on the stem 412.

Of course, the disk 411 can also be simply keyed by forcing on the stem 412.

In a fifth embodiment thereof, shown schematically in FIG. 9 and designated therein by the reference numeral 510, the device 510 comprises a dome 511 which, instead of being keyed so as to surround the stem 512 as in the first embodiment of the device 10 or 110, is fixed to the upper face 512b of such stem by way of one or more threaded elements 532.

The cover 517, which is monolithic with the tubular body 514, is therefore arranged so as to surmount both the stem 512 and the body 515 of the actuator 513.

In a sixth embodiment, shown schematically in FIG. 10, the device 610 comprises a covering element, which is constituted by a dome 611 which, instead of being keyed to the stem 612 of the gas actuator cylinder 613, is fixed to the translating body 623 against which the gas actuator cylinder 613 is designed to act.

The translating body 623 is for example the movable part, which is arranged upward according to what is shown in FIG. 10, of a die or of a press.

This solution allows to interpose the dome 611 between the opening 616 of the body 615 of the actuator 613, from which the stem 612 exits, and the translating body 623 from which oil and other undesirable debris usually descend, without resorting to particular machinings of the stem 612 but simply by fixing for example by means of screws 632 the cover 617 of the dome 611 to the translating body 623 or to another body which is rigidly coupled thereto.

The guard according to the invention must be understood as being providable also in other embodiments which are similar to such sixth embodiment, in which respectively the telescopic dome 211 and the concertina hood 311 are fixed to a corresponding translating body instead of being keyed to the stem of the actuator with which they are associated.

The guard according to the invention, in addition to protecting against aggressive liquids, is also very useful for sheltering gas cylinder actuators from metal waste and various dirt, which is typical of sheet metal dies and causes damage to the rubber and polyurethane seals of gas cylinder actuators.

The dome 11, 211, 511, the disc 411 and the concertina hood 311 must be understood as being providable in any shape and size to be fitted on gas cylinder actuators of any type.

In practice it has been found that the invention thus described solves the drawbacks noted in known types of protection for gas cylinder actuators.

In particular, the present invention provides a guard 10 which can be applied easily also to existing and operating actuators, since it is sufficient to act, if necessary, with simple machinings on the end 12a or 112a of the stem 12 or 112, or even just to force the dome, the disk or the hood, depending on the embodiment, for their hole, on such stem of the actuator, without resorting to any machining.

Further, the present invention provides a guard which prevents oils or any other liquid or fluid in general, but also waste, dust and other machining residues, from reaching the dynamic seals provided within the body of a gas cylinder actuator for the stem, with great advantages for the durability of the actuator.

Moreover, the present invention provides a guard for gas cylinder actuators which can be manufactured cheaply with known systems and technologies.

The invention thus conceived is susceptible of numerous modifications and variations, all of which are within the scope of the appended claims; all the details may further be replaced with other technically equivalent elements.

In practice, the materials employed, so long as they are compatible with the specific use, as well as the dimensions, may be any according to requirements and to the state of the art.

The disclosures in Italian Patent Application No. PD2007A000226 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

What is claimed is:

1. A guard fixed to a gas cylinder actuator, said guard comprising a covering element that is constituted by a monolithic dome, said monolithic dome being fixed to a stem of the gas cylinder actuator, said monolithic dome being contoured so as to extend radially from a fixing region between the monolithic dome and the stem in order to protect the stem and an opening of a body of the actuator from which said stem slidingly exits along an axial sliding direction, said monolithic dome being made of plastic material, and the monolithic dome comprising an annular cover which surrounds the stem that enters a central hole of said annular cover such that the monolithic dome is keyed at an end of the stem of the gas cylinder actuator, wherein said central hole being keyed in an annular slot provided on said end of said stem such that the monolithic dome keyed by interference on said stem, and the monolithic dome further comprising a substantially cylindrical tubular body extending from said annular cover and slidingly connected together with the stem with respect to the body of the actuator, and said tubular body being shaped so as to directly cover at least part of the body of the actuator both when the stem is completely extended from said body and when the stem is completely retracted into said body, said monolithic dome, which includes said annular cover together with said tubular body extending from said annular cover, being shaped such that it is substantially impossible for fluid falling from above said actuator with respect to said axial sliding direction to reach said opening of said body from which said stem slidingly exits to protect the stem and the opening of the body of the actuator from which the stem slidingly exits.

2. The guard fixed to the gas cylinder actuator according to claim 1, wherein said plastic material is polyurethane.

3. The guard fixed to the gas cylinder actuator according to claim 1, wherein said monolithic dome is transparent such that said gas cylinder actuator is visible for checking by an operator.

4. The guard fixed to the gas cylinder actuator according to claim 1, wherein said monolithic dome is semitransparent such that said gas cylinder actuator is visible for checking by an operator.

5. The guard fixed to the gas cylinder actuator according to claim 1, wherein said stem is a cylindrical stem with a cylindrical outer surface in which said annular slot is directly provided at said end such that said annular slot has a circumference that is less than a circumference of said cylindrical outer surface.

6. The guard fixed to the gas cylinder actuator according to claim 5, wherein said annular slot is provided at said end of said cylindrical stem by machining.

* * * * *